Figure 1:
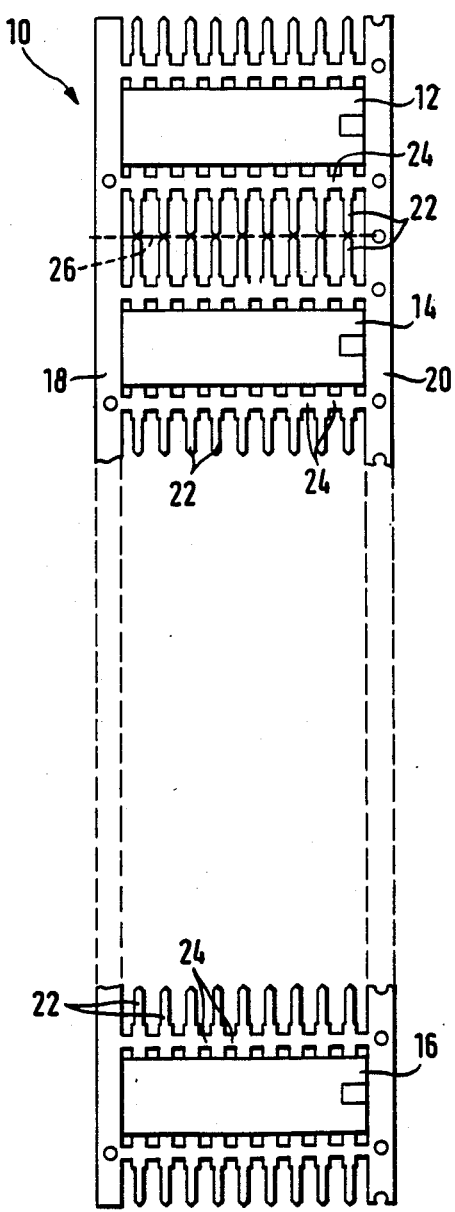

United States Patent [19]

Schmid

[11] Patent Number: 4,697,784

[45] Date of Patent: Oct. 6, 1987

[54] INJECTION MOLD FOR PRODUCING THE HOUSINGS OF INTEGRATED CIRCUITS

[75] Inventor: Hermann Schmid, Schwaig, Fed. Rep. of Germany

[73] Assignee: Texas Instruments Incorporated, Dallas, Tex.

[21] Appl. No.: 835,901

[22] Filed: Mar. 4, 1986

[30] Foreign Application Priority Data

May 15, 1985 [DE]  Fed. Rep. of Germany ....... 3517607

[51] Int. Cl.⁴ .............................................. B22C 9/20
[52] U.S. Cl. .................................... 249/119; 249/83; 249/161; 425/121; 425/127; 425/129 R; 425/572; 425/588; 425/589; 425/595
[58] Field of Search ............... 425/121, 110, 116, 117, 425/127, 129 R, 161, 595, 572, 408, 588, 556, 589; 249/83, 119, 85, 66 R, 67, 68, 161

[56] References Cited

U.S. PATENT DOCUMENTS

| | | | |
|---|---|---|---|
| 2,227,966 | 1/1941 | Emsley | 249/79 |
| 3,050,807 | 8/1962 | Clevemans | 425/408 |
| 4,332,537 | 6/1982 | Slepcevic | 249/83 |
| 4,555,086 | 11/1985 | Kiyotomo | 249/67 |
| 4,599,062 | 7/1986 | Konishi | 425/116 |

Primary Examiner—Bernard Nozick
Attorney, Agent, or Firm—Mel Sharp; Rhys Merrett; Gary Honeycutt

[57] ABSTRACT

An injection mold is described for producing the housings of integrated circuits. The injection mold icludes a first mold half (30) in which are disposed a number of mold recesses (46) corresponding to the number of housings to be made simultaneously, having a depth corresponding to a portion of the height of the housings, and supply passages (48, 50, 52, 54, 56, 58) leading to the mold recesses (46). In a second mold half (32) which is adapted to be brought in the closure direction into engagement with the first mold half (30) a number of mold recesses (76) equal to the number in the first mold half (30) are disposed in corresponding arrangement, the depth thereof being equal to the remaining portion of the height of the housings to be made. The mold recesses (46) in one of the mold halves (32) are disposed groupwise in mold portions (64) which are held in the one mold half (32) displaceably in the closure and opening direction. The mold portions (64) are held in the closed state of the mold individually in force-locking manner in engagement on the other mold half (30).

5 Claims, 4 Drawing Figures

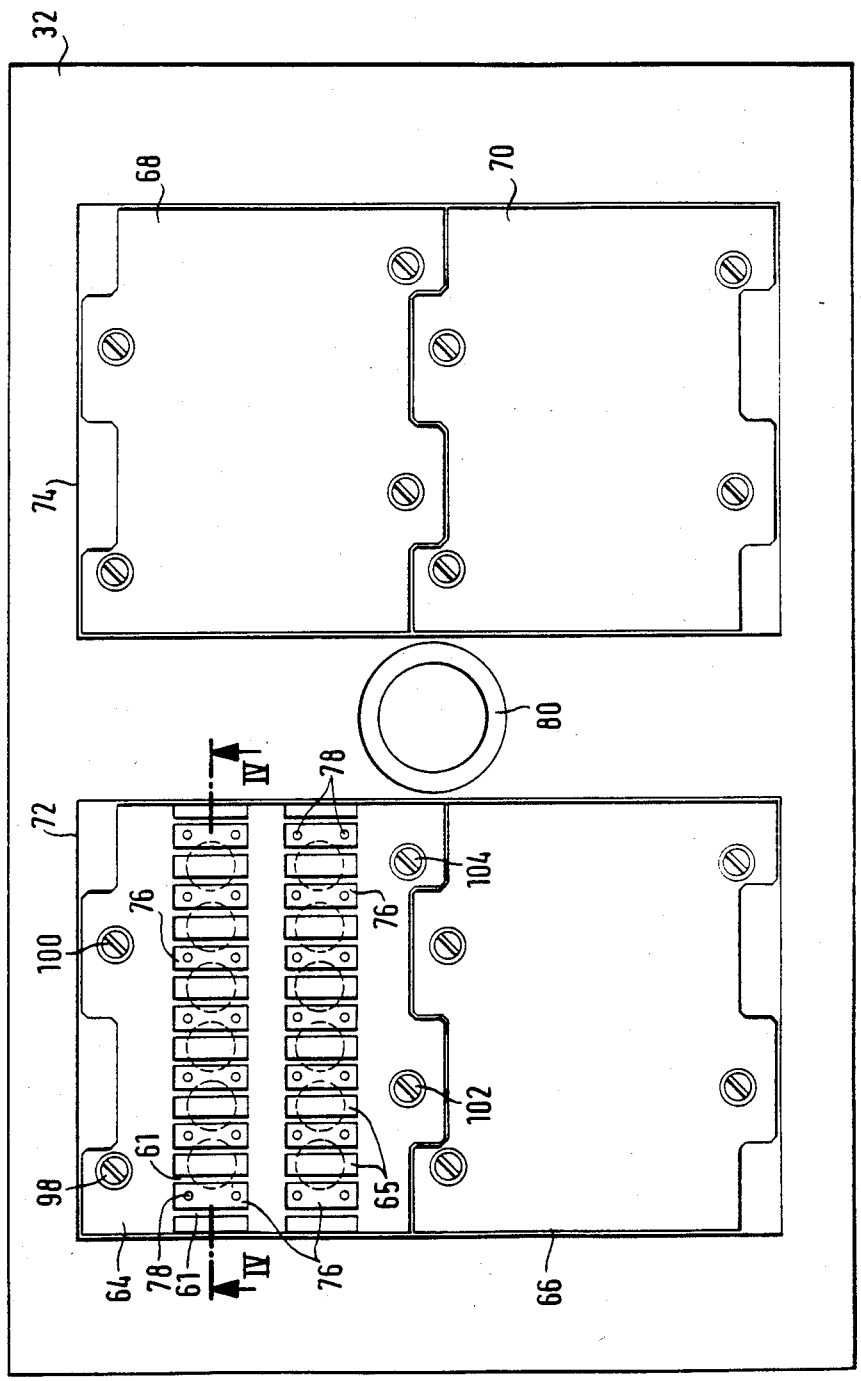

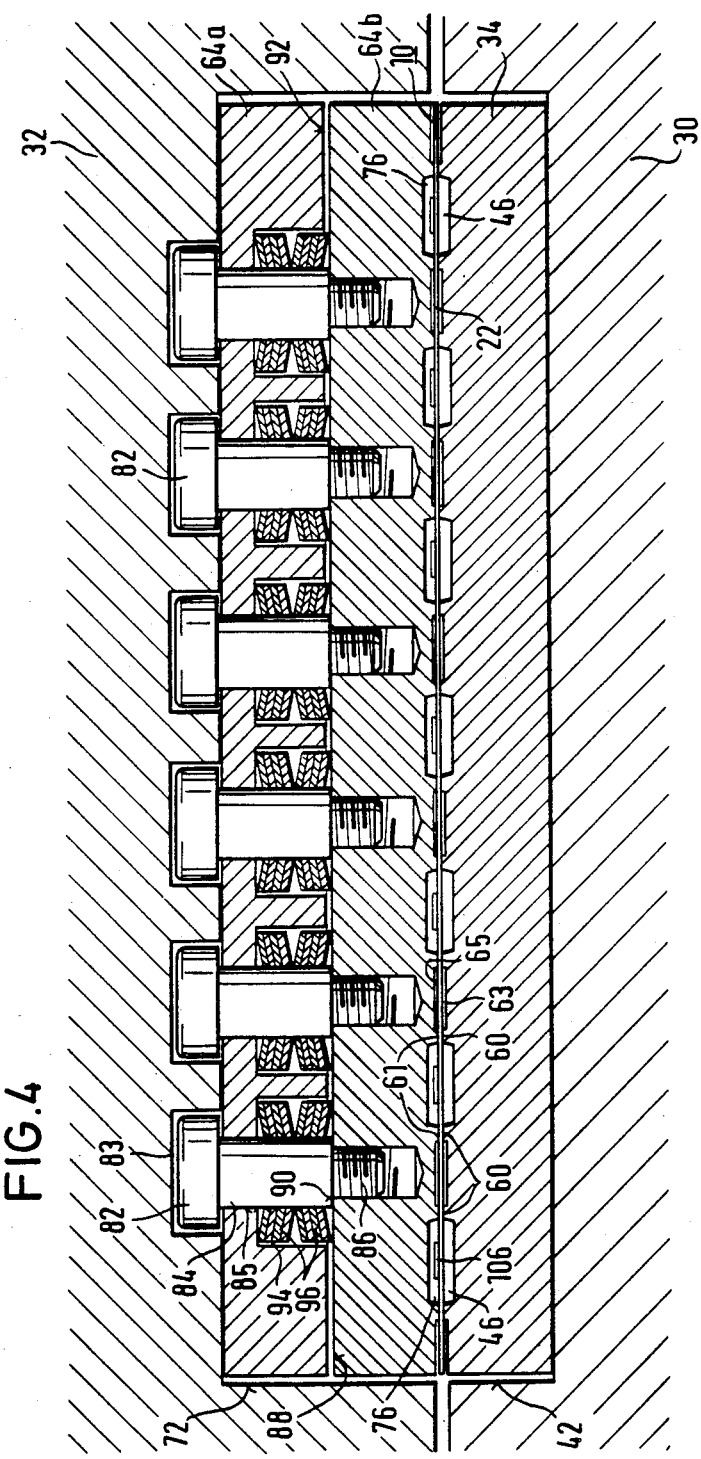

INJECTION MOLD FOR PRODUCING THE HOUSINGS OF INTEGRATED CIRCUITS

The invention relates to an injection mold for producing the housings of integrated circuits with a first mold half in which are formed a number of mold recesses corresponding to the number of housings to be simultaneously produced, said mold recesses having a depth corresponding to a portion of the height of the housings, and supply passages leading to the mold recesses, and a second mold half which is adapted to be brought in the closure direction to bear on the first mold half and in which an equal number of mold recesses as in the first mold half are disposed in corresponding array, having a depth equal to the remaining portion of the height of the housings to be produced.

During the production of integrated circuits when the method steps have been carried out with which the electrical circuit has been produced in a semiconductor wafer the semiconductor wafers are placed on support surfaces of a conductor strip intended therefor out of which terminal conductors have already been stamped which finally project out of the housing of the finished integrated circuit and form the terminal pins thereof. The terminal conductors are initially not completely separated from each other but connected to each other by webs. The conductor strips contain in a row in each case a relatively large number of terminal conductor groups, each of which is associated with a semiconductor wafer and thus with an integrated circuit to be made. This arrangement facilitates the handling and permits extensive automation of the production of integrated circuits.

After the attachment of the semiconductor wafers to the associated areas of the conductor strips and establishing the connections between contact zones on the semiconductor wafer and the associated terminal conductors in each terminal conductor group, the areas carrying the semiconductor wafers and the portion of the terminal conductors leading thereto have a plastic material injected therearound in an injection mold in such a manner that a housing in the known dual-in-line form results. After the production of the housings the integrated circuits in the conductor strip are still connected together via the terminal conductors and via edge strips of the conductor strip and must first be separated from each other in a punching apparatus. The punching apparatus simultaneously also removes the still present connecting webs between the terminal conductors. For completion of the integrated circuits the terminal conductors are then bent over so that they all extend substantially perpendicularly to the major plane of the housing.

In an injection mold hitherto used for producing the housings in the two mold halves a relatively large number of mold recesses is provided which are so arranged that several of the aforementioned conductor strips can be inserted, every two associated mold recesses defining a mold cavity for forming a housing. Because of the relatively large number of mold recesses in the two mold halves the areas to be brought to bear on each other on closure of the injection mold are relatively large. However, with large areas it is very difficult to grind the closure face of the two mold halves so plane that with the mold closed all the mold recesses defining a housing bear on each other so tightly that no plastic material can emerge at the joint faces and deposit on the outwardly projecting terminal conductors. Further factors impairing a tight closing of the mold are the production tolerances of the mold halves, which are screwed together from a plurality of plates. The plates consist partly of steel and partly of heat-insulating material. The different thermal expansion coefficients of the plates also impair the tightness of the mold. The mold halves are screwed in the injection molding machines to receiving tables which in turn because of production tolerances can be detrimental to a tight closing of the mold.

The deposition of plastic material on the terminal conductors projecting outwardly at the housings is very undesirable in the fabrication of integrated circuits. For the terminal conductors can then no longer be completely tinned and consequently cannot be reliably connected to electrical conductor paths on printed circuit boards. As already mentioned, following the production of the housings the connecting webs still present between the terminal conductors are removed by punching. The plastic material used for the housings of integrated circuits is a glassfibre-reinforced plastic material which has the unpleasant property of rapidly blunting the punching tools used to sever the connecting webs when because of possible leakage from the mold recesses this material covers as a thin layer the terminal conductors in the region of the connecting webs to be severed. The punching tools must therefore be replaced at very short intervals of time.

To avoid the problem of leakage hitherto very high closure pressures of the injection mold were used which were of the order of magnitude of 200 t and more. In addition, whenever leakage occurred in a region of the closure face an attempt was made to re-establish the desired parallelism of the closure faces by adjusting the mold halves in order to obtain the desired whole-area sealing contact of the closure faces.

The adjustment operations had to be carried out at relatively short intervals of time and in addition themselves required a relatively long time because the injection mold is of course very hot in operation so that the work had to be carried out with asbestos gloves. Since to obtain the desired adjustment of the mold halves the operation was carried out with shim films of 1/100 to 3/100 mm, the necessity of wearing asbestos gloves during the adjustment operation proved to be a great hinderance.

The problem underlying the invention is to further develop an injection mold of the type outlined in such a manner that with simple means without special adjustment operations a very good tightness or sealing of the mold recesses can be achieved on the entire mold closure face.

According to the invention this problem is solved in that the mold recesses are disposed in one of the mold halves in groups in mold portions which are held in the mold half displaceably in the closure and opening direction and that the mold portions in the closed state of the mold are held individually in force-locking manner in engagement with the other mold half.

In the injection mold according to the invention by the division of the closure face of one of the mold halves into a plurality of smaller areas the problem of bringing two large areas into exact engagement with each other is diminished. The mold portions displaceable in the direction of the closure force are held in engagement on the other mold half under the action of the force providing the force locking and it has been found that the desired tightness can be obtained with a substantially smaller closure force. It was even possible to reduce the total closure force to less than half the hitherto usual closure force using the same injection pressure with which the plastic material is injected into the mold. Because of the tight seal no plastic material reaches the terminal conductors projecting outwardly from the injection molded housings so that the subsequent severing of the connecting webs between the terminal conductors in a punching tool presents no difficulty whatever. The punching tools remain sharp and thus completely functionable for a substantially greater period of time.

Advantageous further developments of the invention are characterized in the subsidiary claims.

Figure 2:
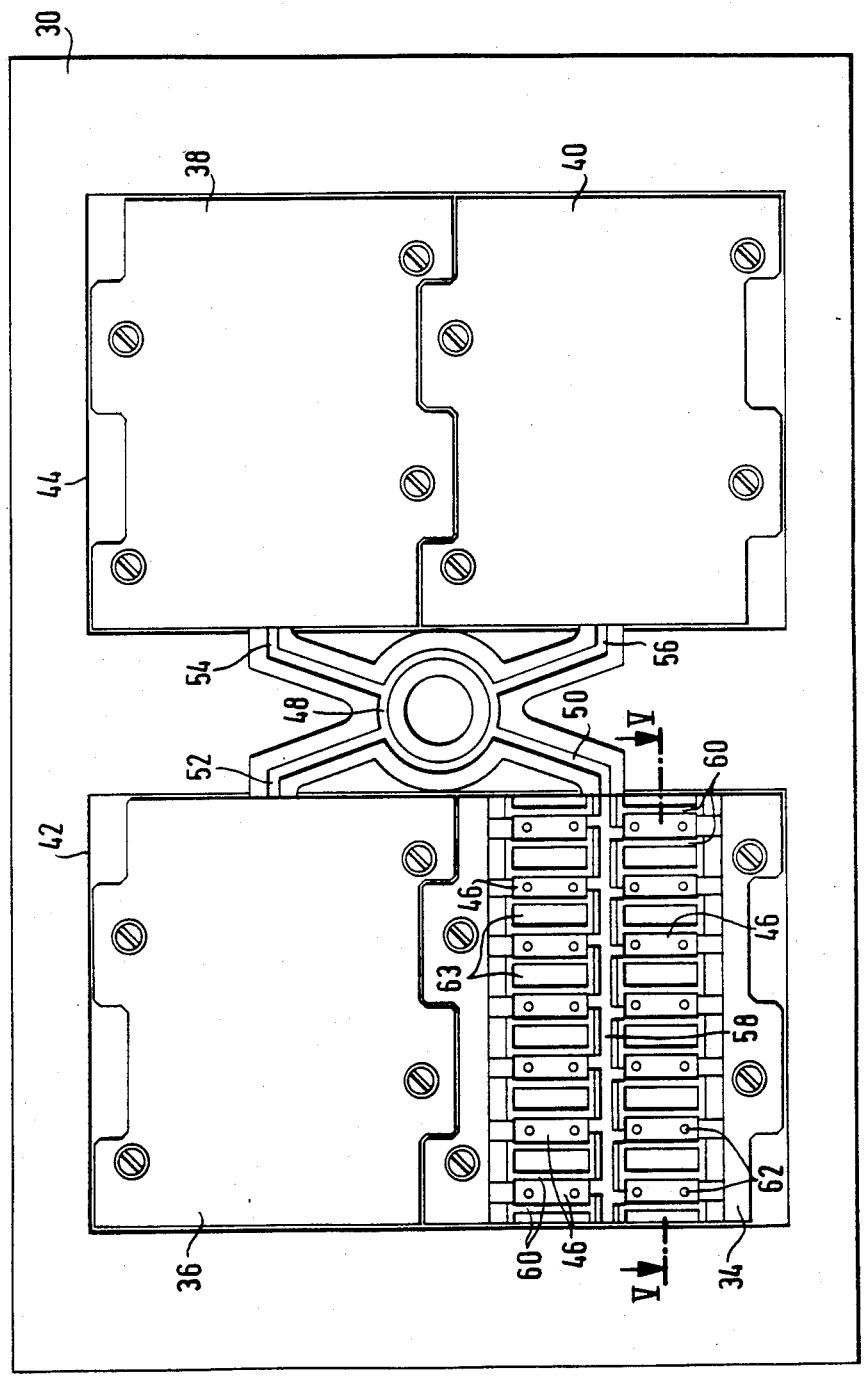

An example of embodiment of the invention will now be explained in detail with reference to the drawings, wherein:

FIG. 1 is a plan view of a conductor frame comprising a plurality of integrated circuits still joined together at the terminal conductors, FIG. 2 is a bottom view of the lower mold half of the injection mold according to the invention, FIG. 3 is a plan view of the upper mold half of the injection mold according to the invention and FIG. 4 is a section of the upper mold half, taken along the line IV—IV of FIG. 3.

FIG. 1 illustrates a conductor strip 10 as used in the extensively automated production of integrated circuits. The conductor strip 10 forms a continuous support element with the aid of which in the individual production steps a plurality of integrated circuits can be simultaneously handled. FIG. 1 shows the conductor strip 10 after housings 12, 14, 16 of the integrated circuits to be produced have been injected into an injection mold still to be described. The integrated circuits in this stage are still joined together via longitudinal webs 18, 20 and via terminal conductors 22 projecting outwardly at the housings 12, 14, 16. For simplification, in FIG. 1 only three housings 12, 14, 16 with the terminal conductors 22 projecting outwardly therefrom are illustrated although in practice a conductor strip 10 carries a greater number of such housings.

To complete the integrated circuits the conductor strip 10 is placed in a punching apparatus in which the longitudinal webs 18, 20 and connecting webs 24 between the terminal conductors 22 are punched out. In addition, the terminal conductors 22 still joined together are separated from each other along the line 26 indicated in dashed line in FIG. 1. The terminal conductors are then bent over exactly at their exit point from the respective housing so that they project substantially perpendicularly to the major plane of the housing towards the housing lower side. With reference to FIG. 1 this means that the terminal conductors 22 are bent over so that they all extend into the plane of the drawing at an angle of about 90° to said plane.

To make the housings an injection mold is used which comprises a lower mold half 30 illustrated in FIG. 2 and an upper mold half 32 illustrated in FIG. 3. In the lower mold half shown from above in FIG. 2 four mold portions 34, 36, 38, 40 are formed in pairs in the arrangement apparent from the illustration in depressions 42 and 44. To simplify the drawing only the mold portion 34 has been shown in all detail; the mold portions 36, 38 and 40 are formed like the mold portion 34 so that the following description of the latter also applies to the other mold portions of the lower mold half 30.

The mold portion 34 comprises in its face facing the upper mold half fourteen mold recesses 46 which are arranged in two rows of seven each. These mold recesses correspond in their outer dimensions to the dimensions of the housings to be made and their depth is equal to half the housing height. The mold half 30 has a central annular supply passage 48 via which the plastic material intended for the formation of the housings is supplied. From this supply passage 48 branch passages 50, 52, 54, 56 originate with which the plastic material is supplied to the distributing passages 58 in the mold portions 34, 36, 38, 40 leading to the mold recesses 46. At the mold portion 34 the distributing passage 58 can be seen with its branches leading to the respective mold recesses 46.

Except for the point at which the branches from the distributing passage 58 lead into the mold recesses 46, the latter are surrounded by webs 60 which ensure the seal between the individual mold recesses. Opposite the branches from the distributing passage 58 the webs surrounding the respective mold recesses are formed in such a manner that in the closed state of the injection mold a very thin gap remains open through which during injection of plastic material air can escape from the mold recesses. As a result, distribution of the plastic material into the mold recesses during injection is not obstructed by the enclosed air.

In the view of FIG. 2 in the individual mold recesses the end faces of ejector pins 62 can also be seen which in the closed state of the injection mold lie in a plane with the bottom surface of the associated mold recess 46 but on opening of the mold project into the mold recess and thereby eject the injection molded housings out of the mold recesses 46.

In FIG. 3 the upper mold half is shown as seen from below. In the upper mold as well four mold portions 64, 66, 68, 70 are formed in the arrangement illustrated in corresponding depressions 72, 74. In FIG. 3 only the mold portion 64 is shown in all detail; the mold portions 66, 68, 70 are formed in the same manner so that the subsequent description of the mold portion 64 also applies to them.

The mold portion 64 contains two rows each of seven mold recesses 76 which are disposed in positions corresponding to the mold recesses 46 of the mold portions in the lower mold half. In the closed state of the injection mold every mold recess 46 of the lower mold half forms with a corresponding mold recess 76 of the upper mold half the mold cavity for a housing of an integrated circuit.

In the mold recesses 76 as well the end faces of ejector pins 78 can be seen which serve the same purpose as the ejector pins 62 in the mold recesses 46.

In the upper mold portion 32 a central distributing passage 80 is formed which in cooperation with the supply passage 48 of the lower mold half facilitates uniform supply of the plastic material to the branch passages 50, 52, 54, 56.

The mold portions 34, 36, 38, 40 of the lower mold half and the mold portions 64, 66, 68, 70 of the upper mold half 32 are secured in different manner in the mold halves. Whereas the mold portions in the lower mold halves are fixedly screwed so that they are immovable, the mold portions of the upper mold half are secured so that they are displaceable in the closure and opening direction of the injection mold.

In the section illustrated in FIG. 4 along the line IV—IV of FIG. 3, which is amplified by the section along the line V—V of FIG. 2, it can be seen that the mold portion 64 is made up of two plate-shaped portions 64a and 64b which are held together with the aid of bolts 82. In contrast, the mold portion 34 is in one piece and as already mentioned above fixedly screwed to the lower mold half 30.

The bolts 82 have cylindrical shanks 84 which extend freely displaceably through corresponding bores 85 in the portion 64a. At the ends of the bolts 82 there are threaded portions 86 which are screwed into threaded bores in the portion 64b of the mold portion 64. In the screwed-together state the upper face 88 of the portion 64b bears on collars 90 of the bolts 82 which are formed at the transition between the shanks 84 and the threaded portions 86. The shanks 84 of the bolts 82 are longer than the thickness of the portion 64a so that even when the threaded portions 86 are completely screwed into the portion 64b and the face 88 bears on the collars 90 there is still a clearance between the face 88 of the portion 64b and the face 92 of the portion 64a opposite thereto.

The bores 85 in the portion 64a surrounding the shanks have at their ends facing the portion 64b widenings 94 which surround the shanks annularly. In these widenings spring washer packs 96 are disposed which after tightening of the bolts 82 press the portions 64a and 64b apart in the axial direction of the bolts 82. Only when a force is exerted in the axial direction of the bolts 82 on the portion 64b which is greater than the total force of all the spring washer packs will the portion 64b be moved in the direction towards the portion 64a. With the aid of the bolts 98, 100, 102, 104 the portion 64a of the mold portion 64 is fixedly screwed in the upper mold half 32.

In the section of FIG. 4 the injection mold is shown in the closed state in which the closure faces of the mold halves 30 and 32 bear on each other. In the region of the mold recesses 46, 76 a conductor strip 10 is inserted, the cavities defining the housing form being clearly apparent. For clarification, a semiconductor wafer 106 containing the electrical circuit is also associated with each of these cavities on the semiconductor strip 10. It is also clearly apparent how the webs 60 of the lower form half 30 cooperating with corresponding webs 61 of the upper form half 32 effect the sealing of a cavity defining the housing form. It should be observed that these webs bear exactly on those areas of the conductor strip 10 at which closed metal faces are present, i.e. on the connecting webs 24 between the terminal conductors still present in this stage of the fabrication.

As long as the injection mold equipped with the mold halves 30 and 32 described is open the lower face in FIG. 4 of the mold portion of the upper mold half 32 made up of the portions 64a and 64b projects slightly out of the plane of the closure face so that when the mold is closed firstly these areas of the upper mold half 32 come into contact with corresponding areas of the lower mold half 30. When the mold is completely closed the pressure with which the mold portion 64 is held against the mold portion 34 depends solely on the force developed by the plate spring or spring washer packs 96. It is merely necessary to ensure that the total closure force acting on the mold halves is greater than the force developed by all the spring washer packs 96.

In the example of embodiment realised in practice the projection of the mold portions 64 in the upper mold half 32 was about 0.36 mm and with each bolt 82 two four-layer spring washer packs 96 were associated which had a total spring travel of 0.48 mm. The two spring washer packs at each bolt developed in the closed state of the mold a spring force of 10,800 N so that with the 48 spring washer pack pairs used in the example of embodiment illustrated a total spring force of 518,400 N resulted. This force is several times greater than the opening force acting on the mold halves 30 and 32 due to the injection pressure and consequently the cavities defining the individual housings to be made can be held very tightly together at the joints so that no plastic material can escape and reach the terminal conductors projecting out of the cavities. If the sealing tightness were no longer ensured the terminal conductors would be coated with a thin plastic layer leading to damage of the punching tools in the region of the webs 60, i.e. precisely where in a subsequent operation the connecting webs 24 must be punched away.

As apparent from the section of FIG. 4 the terminal conductors 22 are exposed in the regions lying between the webs 60 outside the housing boundaries because in these regions in the mold portions between the respective mold recesses depressions 63, 65 are formed which are also apparent in the views of FIGS. 2 and 3.

It is apparent from the above description of the injection mold that the desired good sealing tightness of the cavities defining the housing form can be obtained with lower closure forces than was the case with hitherto used injection molds. This is due to the use of displaceably held mold portions and the fact that the displaceable mold portions are held individually in force-locking manner in engagement with the other mold half. The improvement obtained is so decisive that even with injection molding machines developing substantially smaller closure forces, i.e. correspondingly more economical machines, an escape of the plastic material from the respective mold cavities can be prevented with great certainty.

I claim:

1. An injection mold for producing the housings of integrated circuits comprising:
   (1) a first mold half having disposed therein a plurality of mold recesses corresponding in number to the housings to be formed therein, and having a depth corresponding to a portion of the thickness of the housings, said first half also having disposed therein a plurality of supply passages leading to the recesses;
   (2) a second mold half having a plurality of mold portions with recesses therein arranged to coincide with the recesses of the first half, when the halves are brought into the closed position;
   (3) first means within said second half for supporting each of said mold portions displaceably in the closure and opening direction;
   (4) second means within said second half for individually force-locking each of said mold portions into engagement with said first mold half when the halves are brought into the closed position; and
   (5) means in combination therewith for opening and closing said mold halves.

2. Injection mold according to claim 1, wherein mold portions are held by springs in force-locking manner in engagement with the other mold half.

3. Injection mold according to claim 2, wherein the mold portions include in the one mold half of two plate-shaped portions of which the one portion is fixedly connectable to the one mold half whilst the other portion is held together with the one portion by bolts, and which the springs are inserted between the two portions of the mold portion in such a manner that they press the two portions apart.

4. Injection mold according to claim 3, wherein the springs are spring washers which are disposed in widenings annularly surrounding the bolts in the one section of the mold portion.

5. Injection mold according to claim 4, wherein in each widening annularly surrounding a bolt two spring washer packs each having four layers are disposed.

* * * * *